United States Patent
Cook et al.

(10) Patent No.: US 6,206,414 B1
(45) Date of Patent: *Mar. 27, 2001

(54) AIR BAG INFLATOR INCLUDING PLURAL BURST DISKS

(75) Inventors: Fred J. Cook; Kenneth K. Gudewich, both of Gilbert, AZ (US); Tracy L. Nelson, Sparks, NV (US); Chad L. Greenlee, Gilbert; Darrin L. Johnson, Fountain Hills, both of AZ (US)

(73) Assignees: TRW Inc.; TRW Vehicle Safety Systems Inc., both of Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,710

(22) Filed: Aug. 5, 1998

(51) Int. Cl.[7] .......................... B60R 21/32; B60R 21/26
(52) U.S. Cl. ........................ 280/734; 280/736; 280/737
(58) Field of Search .................................. 280/734, 736, 280/737

(56) References Cited

U.S. PATENT DOCUMENTS

| | | |
|---|---|---|
| 5,630,619 | 5/1997 | Buchanan et al. . |
| 5,664,802 | 9/1997 | Harris et al. . |
| 5,709,406 * | 1/1998 | Buchanan .............................. 280/737 |
| 5,803,494 * | 9/1998 | Headley ................................ 280/741 |
| 5,907,120 * | 5/1999 | Mooney et al. ...................... 102/521 |
| 5,941,562 * | 8/1999 | Rink et al. ............................ 280/737 |
| 5,992,881 * | 11/1999 | Faigle .................................. 280/737 |

* cited by examiner

Primary Examiner—Brian L. Johnson
Assistant Examiner—Tony Winner
(74) Attorney, Agent, or Firm—Tarolli, Sundheim, Covell, Tummino & Szabo L.L.P.

(57) ABSTRACT

An air bag inflator (10) includes a container (12) defining a chamber (14), and inflation fluid (66) under pressure in the chamber. A first opening (41) in the container (12) enables fluid flow from the chamber (14) to an inflatable device (32). A first burst disk (60) extends across the first opening (41) and is rupturable in response to an increase in the pressure differential across the first burst disk to a level above a first predetermined pressure differential. The inflator (10) includes a first igniter (90) for, when actuated, increasing the pressure differential across the first burst disk (60) to a level above the first predetermined pressure differential to rupture the first burst disk. A second opening (43) in the container (12) enables fluid flow from the chamber (14) to the inflatable device (32). A second burst disk (62) extends across the second opening (43) and is rupturable in response to an increase in the pressure differential across the second burst disk to a second predetermined pressure differential greater than the first differential. The inflator (10) includes a second igniter (110) actuatable independently of the first igniter (90) for, when actuated, increasing the pressure differential across the second burst disk (62) to a level above the second predetermined pressure differential to rupture the second burst disk.

21 Claims, 4 Drawing Sheets

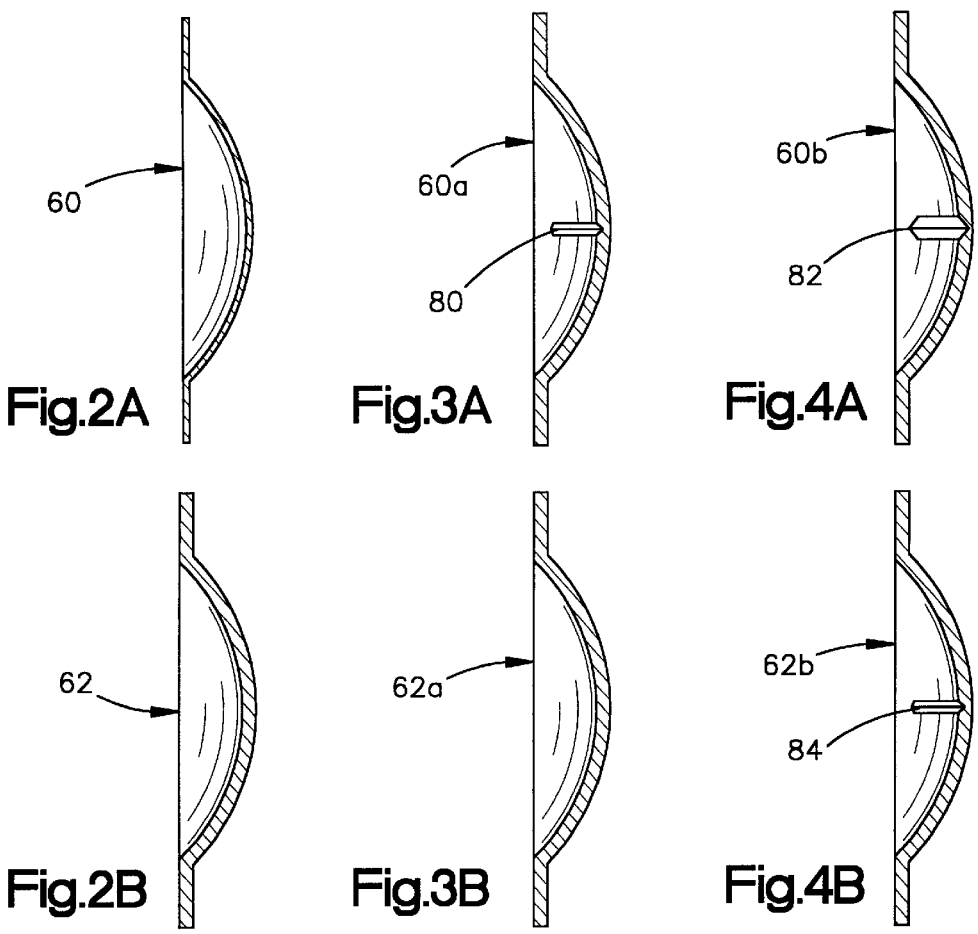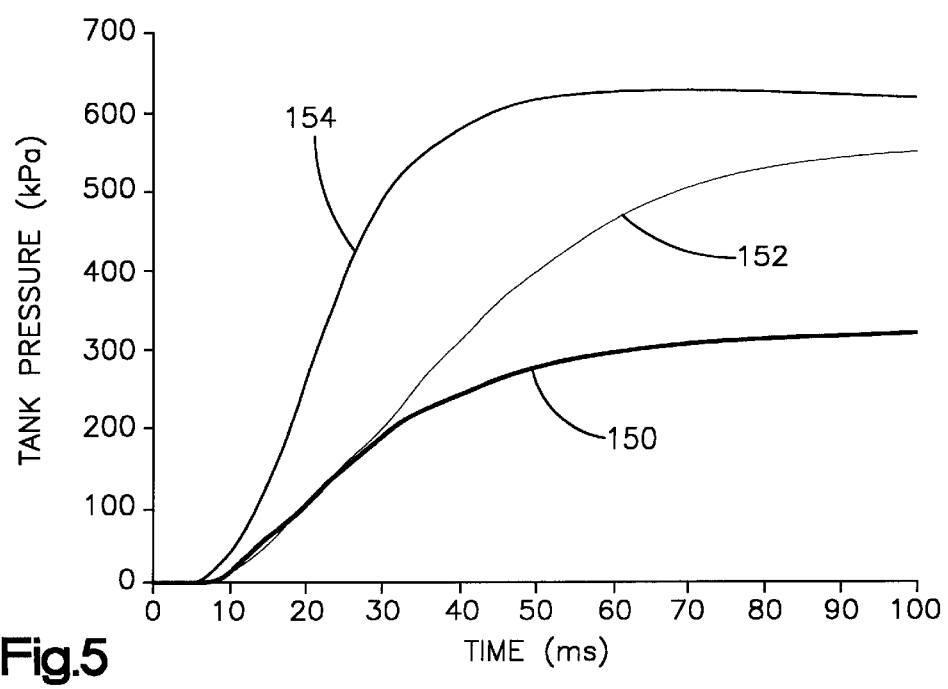

AIR BAG INFLATOR INCLUDING PLURAL BURST DISKS

BACKGROUND OF THE INVENTION

1. Technical Field

The present invention relates to an apparatus for inflating an inflatable vehicle occupant protection device. In particular, the present invention relates to an air bag inflator including two separate fluid outlet openings, with two separate burst disks covering the two outlet openings.

2. Description of the Prior Art

Known air bag inflators include inflation fluid stored under pressure in a chamber in a container. A burst disk blocks flow of inflation fluid from the chamber. An initiator is actuatable to rupture the burst disk and to initiate flow of inflation fluid from the chamber to inflate the air bag.

SUMMARY OF THE INVENTION

The present invention is an apparatus for inflating an inflatable vehicle occupant protection device. The apparatus comprises a container defining a chamber, and inflation fluid under pressure in the chamber. A first opening in the container enables fluid flow from the chamber to the inflatable device. A first burst disk extends across the first opening and is rupturable in response to an increase in the pressure differential across the first burst disk to a level above a first predetermined pressure differential. The apparatus includes first pressurizing means for, when actuated, increasing the pressure differential across the first burst disk to a level above the first predetermined pressure differential to rupture the first burst disk. A second opening in the container enables fluid flow from the chamber to the inflatable device. A second burst disk extends across the second opening and is rupturable in response to an increase in the pressure differential across the second burst disk to a second predetermined pressure differential greater than the first differential. The apparatus includes second pressurizing means actuatable independently of the first initiator means for, when actuated, increasing the pressure differential across the second burst disk to a level above the second predetermined pressure differential to rupture the second burst disk.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIGS. 2A and 2B are sectional views the two burst disks of the inflator of FIG. 1;

FIGS. 3A and 3B are sectional views of the two burst disks of FIGS. 2A and 2B, constructed in an alternative manner;

FIGS. 4A and 4B are sectional views of the two burst disks of FIGS. 2A and 2B, constructed in a further alternative manner;

FIG. 5 is a graph showing several curves representing output pressure of the inflator of FIG. 1 as a function of time;

DESCRIPTION OF PREFERRED EMBODIMENTS

The present invention relates to an apparatus for inflating a vehicle occupant protection device. In particular, the present invention relates to an inflator which has plural fluid outlet passages each covered by a separate burst disk and which is used to inflate an air bag. Other inflatable vehicle occupant protection devices that can be used with an inflator in accordance with the invention include, for example, inflatable seat belts, inflatable knee bolsters, inflatable head liners or side curtains, and knee bolsters operated by inflatable air bags.

Figure 1:
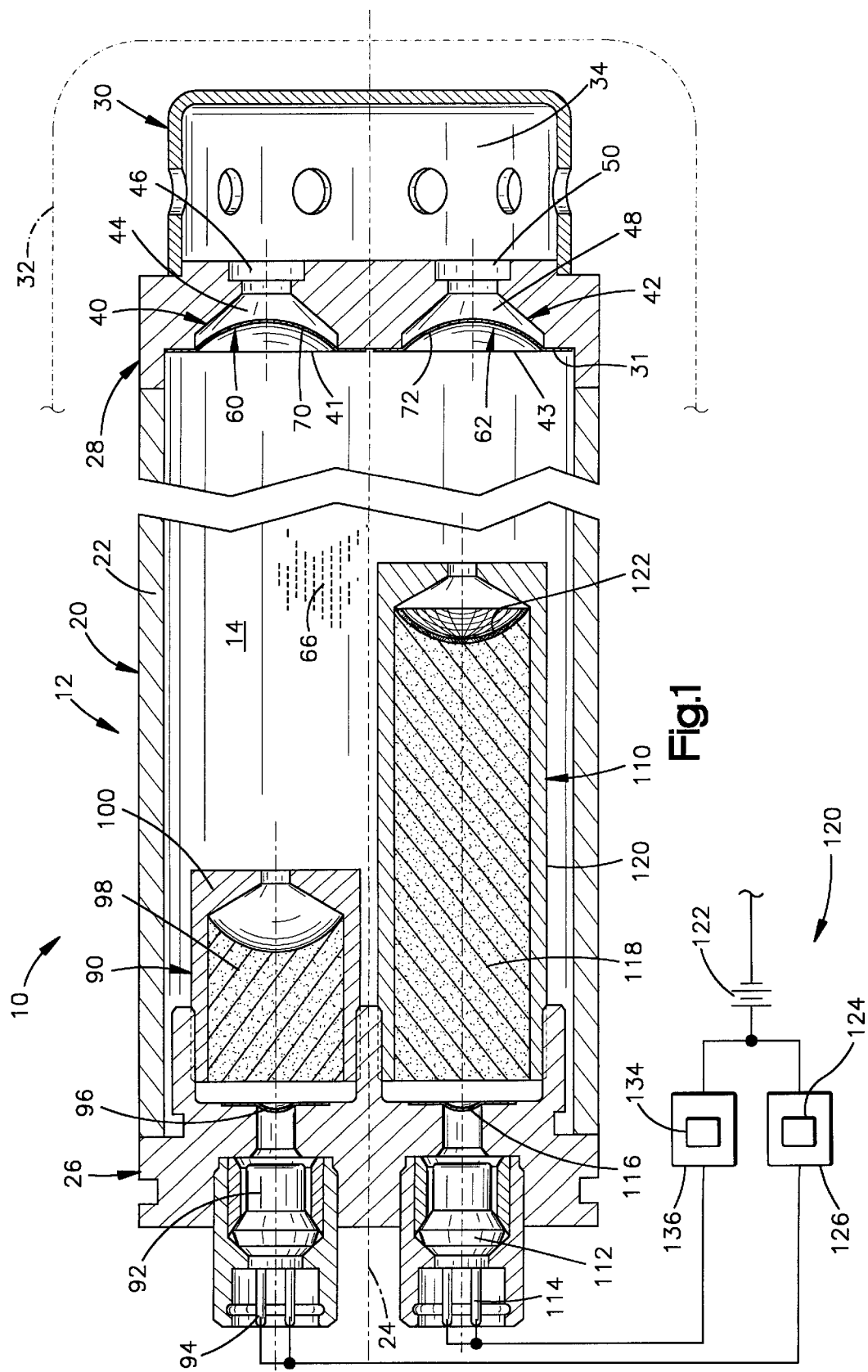
FIG. 1 is a longitudinal sectional view of an air bag inflator constructed in accordance with a first embodiment of the present invention, including two burst disks.

As representative of the present invention, FIG. 1 illustrates an inflator 10. The inflator 10 includes a container 12 which defines a gas storage chamber 14. The container 12 has a cylindrical main body portion 20 which includes an axially extending side wall 22 of the container. The side wall 22 of the container 12 is centered on a longitudinal central axis 24 of the inflator 10. First and second end walls 26 and 28 of the container 12 are fixed to the main body portion 20 of the container.

A diffuser 30 is fixed to the second end wall 28 of the container 12. The diffuser 30 is in fluid communication with an inflatable vehicle occupant protection device in the form of an air bag indicated schematically at 32. The diffuser 30 defines a diffuser chamber 34 which is located outside of the container 12. The diffuser chamber 34 is at ambient air pressure.

First and second outlet passages 40 and 42 are formed in the second end wall 28 of the container 12. The first outlet passage 40 terminates in an opening 41 in an inner end surface 31 of the second end wall 28. The second outlet passage 42 terminates in an opening 43 in the end surface 31. The outlet passages 40 and 42 establish fluid communication between the gas storage chamber 14 and the diffuser chamber 34.

The outlet passages 40 and 42 are spaced apart from each other on opposite sides of the axis 24 and are "in parallel" with each other. Specifically, each one of the outlet passages 40 and 42 provides a separate, independent, fluid flow path between the gas storage chamber 14 and the diffuser chamber 34.

The outlet passages 40 and 42 are identical to each other in size and configuration. The first outlet passage 40 has a frustoconical main portion 44 and a stepped, cylindrical portion 46. The second outlet passage 42 has a frustoconical main portion 48 and a stepped, cylindrical portion 50. Because the outlet passages 40 and 42 are identical to each other in size and configuration, the flow area of the first outlet passage 40 is the same as the flow area of the second outlet passage 42. While passages 40 and 42 are shown as being identically, they may not be identical. For example, cylindrical portion 50 of passage 42 may have a larger diameter than cylindrical portion 46 of passage 40.

A first burst disk 60 is welded to the inner side surface of the second end wall 28. The first burst disk 60 has a domed, circular configuration and extends across the opening 41. The first burst disk 60 blocks fluid flow through the first outlet passage 40.

A second burst disk 62 is welded to the inner side surface of the second end wall 28. The second burst disk 62 has a domed, circular configuration and extends across the opening 43. The second burst disk 62 blocks fluid flow through the second outlet passage 42. The second burst disk 62 is the same size, including diameter, as the first burst disk 60.

A quantity of inflation fluid 66 is stored under pressure in the chamber 14. The inflation fluid 66 preferably comprises an inert gas, such as argon or helium, under pressure. Also, oxygen could be mixed with the inert gas. The inflation fluid 66 is stored at a pressure in the range of about 1,500 psig to about 10,000 psig. The inflation fluid 66 may alternatively comprise a combustible mixture of gases including a primary gas and a fuel gas. The primary gas comprises the majority of the inflation fluid that inflates the air bag 32. The fuel gas, when ignited, heats the primary gas to increase the pressure and temperature of the fluid in the gas storage chamber 14.

The first and second burst disks 60 and 62 have inner side surfaces 70 and 72, respectively, which are exposed to the pressure of the inflation fluid 66 when the first and second burst disks are unruptured. The burst disks 60 and 62 could, alternatively, be formed in one piece with the second end wall 28, as thin-walled sections of the second end wall, for example.

A pressure differential exists across the first burst disk 60 when the inflator 10 is in the unactuated condition shown in FIG. 1, because the inflation fluid 66 in the gas storage chamber 14 is maintained at a pressure greater than the ambient air pressure in the diffuser chamber 34. The first burst disk 60 is rupturable when the pressure differential across the first burst disk exceeds a first predetermined pressure differential. When the inflator 10 is in the unactuated condition shown in FIG. 1, the pressure differential across the first burst disk 60 is less than the first predetermined pressure differential, and the first burst disk does not rupture.

A pressure differential also exists across the second burst disk 62 when the inflator 10 is in the unactuated condition shown in FIG. 1, because the inflation fluid in the gas storage chamber 14 is maintained at a pressure greater than the ambient air pressure in the diffuser chamber 34. The second burst disk 62 is rupturable when the pressure differential across the second burst disk exceeds a second predetermined pressure differential. When the inflator 10 is in the unactuated condition shown in FIG. 1, the pressure differential across the second burst disk 62 is less than the second predetermined pressure differential, and the second burst disk does not rupture.

The first burst disk 60 is designed to rupture at a different pressure than the second burst disk 62. Specifically, the first burst disk 60 is designed to rupture at a lower pressure differential than the second burst disk 62. Because both the first burst disk 60 and the second burst disk 62 are exposed to ambient pressure on one side, from the diffuser chamber 34, the two burst disks rupture at different pressures of inflation fluid 66 in the gas storage chamber 14.

The two burst disks 60 and 62 can be configured in alternative manners to provide the different rupture pressures. As illustrated in FIGS. 2A and 2B, for example, the first burst disk 60 is thinner than the second burst disk 62. The thinner first burst disk 60 is weaker than the second burst disk 62 and will therefore rupture at a lower pressure differential than the second burst disk. For example, the first burst disk 60 may be 0.53 mm thick while the second burst disk 62 is 0.64 mm thick.

As illustrated in FIGS. 3A and 3B, the first burst disk 60a is scored with score lines 80, while the second burst disk 62a is not scored. The presence of the score lines 80 weakens the first burst disk 60a and decreases the pressure differential at which the first burst disk is rupturable.

As illustrated in FIGS. 4A and 4B, the first burst disk 60b is scored with relatively deep score lines 82, while the second burst disk 62b is scored with relatively shallow score lines 84. The greater depth of the score lines 82 in the first burst disk 60b makes the first burst disk weaker than the second burst disk 62b. The first burst disk 60b will, therefore, rupture at a lower pressure differential than the second burst disk 62b.

The inflator 10 includes an electrically actuatable first initiator assembly 90. The first initiator assembly 90 includes a pyrotechnic squib 92 which, when electrically energized over terminals 94, produces combustion products for rupturing an internal burst disk 96. The burst disk 96 is disposed adjacent to a quantity of ignitable material 98 in a casing 100. The end of the casing 100 opposite the squib 92 is open to the chamber 14.

The inflator 10 also includes a second initiator assembly 110 which has the same construction as the first initiator assembly 90. The second initiator assembly 110 includes a pyrotechnic squib 112 which, when electrically energized over terminals 114, produces combustion products for rupturing an internal burst disk 116. The burst disk 116 is disposed adjacent to a quantity of ignitable material 118 in a casing 120. The end of the casing 120 opposite the squib 112 has a screen 122 and is open to the chamber 14 through the screen 122. In the illustrated embodiment, the second initiator assembly 110 is larger than the first initiator assembly 90, that is, it includes a larger amount of ignitable material 118.

The second initiator assembly 110 is energizable independently of the first initiator assembly 90, that is, at the same time, at a different time, or not at all, depending on the vehicle circuitry which controls actuation of the two initiator assemblies. Specifically, the terminals 94 and 114 of the squib 92 and 112, respectively, are connected with vehicle electric circuitry 120 including a power source 122, which preferably comprises the vehicle battery and/or a capacitor.

The circuitry 120 also includes a first normally open switch 124 which is part of a first sensor 126 which senses one or more vehicle conditions that indicate the occurrence of a crash. Such a sensor is known in the art. The first sensor 126 may sense a crash-indicating condition that meets or exceeds a predetermined threshold level. This indicates the occurrence of a crash having a level of severity which is predetermined to require inflation of the air bag 32 or other vehicle occupant protection device associated with the inflator 10. The first switch 124 then closes and electric current is directed through the first squib 92.

The vehicle electric circuitry 120 also includes a second normally open switch 134 which is part of a second sensor 136 which senses one or more vehicle conditions that indicate the occurrence of a crash. Such a sensor is known in the art. The second sensor 136 may sense a crash-indicating condition that meets or exceeds a predetermined threshold level. This indicates the occurrence of a crash having a level of severity which is predetermined to require inflation of the air bag 32 or other vehicle occupant protection device associated with the inflator 10. The second switch 134 then closes and electric current is directed through the second squib 112.

When the first sensor 126 senses a collision-indicating condition at or above the predetermined threshold level, the switch 124 closes and the first squib 92 is energized electrically. The first squib 92 produces hot combustion products which rupture the internal burst disk 96. The combustion products of the first squib 92 ignite the pyrotechnic material 98 in the casing 100.

The combustion products heat and pressurize the inflation fluid 66 in the gas storage chamber 14. The pressure in the gas storage chamber 14 increases sufficiently that the pressure differential across the first burst disk 60 exceeds the first predetermined pressure differential. The first burst disk 60 ruptures and the inflation fluid 66 flows out of the gas storage chamber 14, through the opening 41 and the first outlet passage 40, into the diffuser chamber 34. The inflation fluid 66 flows from the diffuser chamber 34 to the air bag 32, to inflate the air bag.

When, in this manner, only the first initiator assembly 90 is actuated, and not the second initiator assembly 110, the second burst disk 62 does not rupture. Specifically, the second predetermined pressure differential, at which the second burst disk 62 ruptures, is selected so that the second burst disk does not rupture at the pressure levels reached in the gas storage chamber 14 as a result solely of actuation of the initiator assembly 90.

In order to rupture the second burst disk 62 in addition to the first burst disk 60, the second initiator assembly 110 must be actuated in addition to the first initiator assembly 90. Actuating the second initiator assembly 110 in addition to the first initiator assembly 90, by operation of the second sensor 136 and the second switch 134, raises the pressure in the gas storage chamber 14 enough so that the pressure differential across the second burst disk 62 exceeds the second predetermined pressure differential, thus rupturing the second burst disk.

Specifically, when the vehicle electric circuitry 120 determines that the second burst disk 62 should be opened to increase the flow rate of the inflation fluid 66 into the diffuser chamber 34, the second switch 134 closes and the squib 112 is energized electrically. The second squib 112 produces hot combustion products which rupture the internal burst disk 116. The combustion products of the second squib 112 ignite the pyrotechnic material 118 in the casing 120.

The combustion products of the second initiator assembly 110 further heat and pressurize the inflation fluid 66 in the gas storage chamber 14. The pressure in the gas storage chamber 14 increases sufficiently that the pressure differential across the second burst disk 62 exceeds the second predetermined pressure differential. The second burst disk 62 ruptures. The inflation fluid 66 flows out of the gas storage chamber 14, through the opening 43 and the second outlet passage 42, into the diffuser chamber 34.

The vehicle electric circuitry 120 is operable, in a known manner, to energize either or both of the initiator assemblies 90 and 110, simultaneously or at a time interval. It is thus possible to tailor the overall rate of fluid flow into the air bag 32 by controlling whether one or both initiator assemblies 90 and 110 are energized, which one is energized first, and the timing of the energization of the two initiator assemblies.

For example, the lower curve 150 in FIG. 5 represents output pressure of the inflator 10 as a function of time, in the case when only the first initiator assembly 90 is actuated and only the first burst disk 60 is ruptured. The first outlet passage 40 forms the only fluid outlet path for the inflation fluid 66 in the gas storage chamber 14. The actuation of only the first initiator assembly 90 provides a relatively shallow output curve and a relatively low peak pressure.

The middle curve 152 in FIG. 5 represents output pressure of the inflator 10 as a function of time, in the case when the second initiator assembly 10 additionally is actuated after a time delay following the actuation of the first initiator assembly 90. The fluid outlet path for the inflation fluid 66 in the chamber 14 includes only the first outlet passage 40. The flow area of the first outlet passage 40 and actuation of the first and second initiator assemblies 90 and 110 provide a higher peak pressure, than actuation of the first initiator only. Because of the time delay, the second initiator assembly 110 does not raise the pressure in the chamber 14 high enough to rupture the second burst disk 62.

The upper curve 154 in FIG. 3 represents output pressure of the inflator 10 as a function of time, in the case when the first and second initiator assemblies 90 and 110 are actuated at the same time or in sequence with a small time delay. The pressure in the gas storage chamber 14 increases rapidly to a level at which the first and second burst disks 60 and 62 rupture at almost the same time. This provides a steeper output curve, and a higher peak pressure, than either of the lower two curves 150 and 152.

Figure 6:
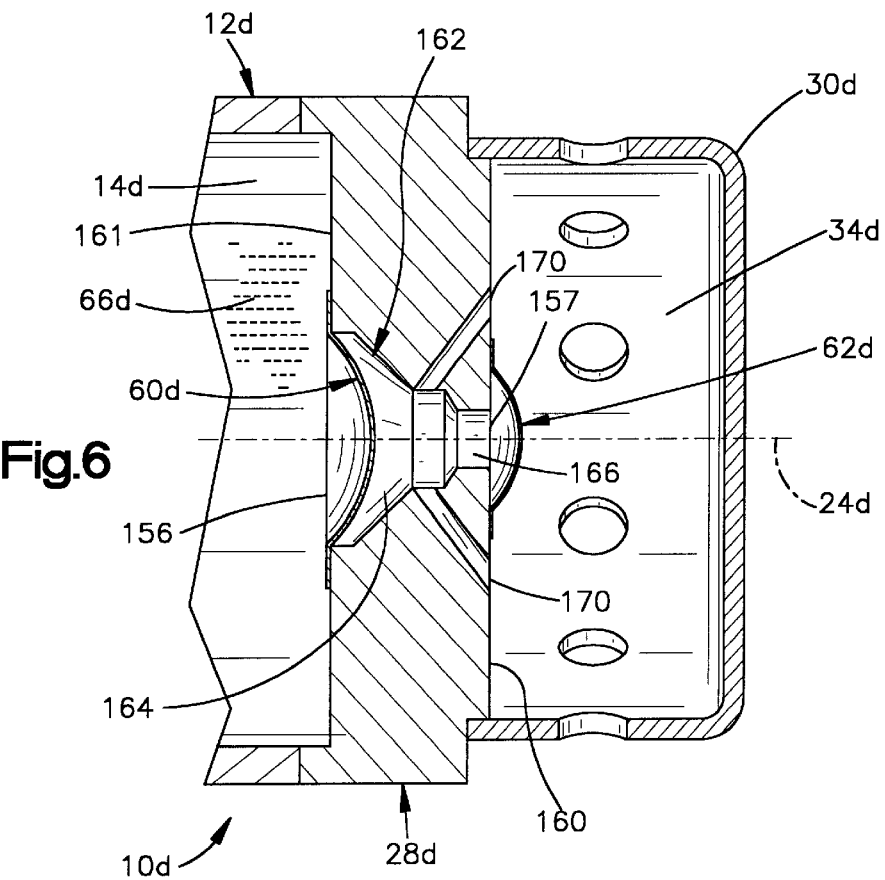
FIG. 6 is a view similar to FIG. 1 of a portion of an air bag inflator constructed in accordance with a second embodiment of the present invention.

FIG. 6 illustrates a portion of an inflator 10d constructed in accordance with a second embodiment of the present invention. Parts of the inflator 10d which are the same as, or similar to, parts of the inflator 10 are given the same reference numerals, with the suffix "d" added to distinguish them.

In the inflator 10d, the container 12d has a single outlet passage 162. The outlet passage 162 has a frustoconical portion 164 which extends from an opening 156 in an inner side surface 161 of the second end wall 28d. The outlet passage 162 has a stepped, cylindrical portion 166 which terminates in an opening 157 in an outer end surface 160 of the second end wall 28d.

The inflator 10d includes a first burst disk 60d which is fixed to the inner side surface 161 of the second end wall 28d. The first burst disk 60d extends across the opening 156 in the surface 161.

The second burst disk 62d is fixed in a manner not shown, such as by welding, to the outer end surface 160 of the second end wall 28d of the container 12d. The second burst disk 62d extends across the opening 157 in the surface 160.

The second burst disk 62d when unruptured blocks fluid flow through the opening 157. The second burst disk 62d is thus "downstream" of, or "in series" with, the first burst disk 60d. The second burst disk 62d is not exposed to the pressure of the inflation fluid 66d in the chamber 14d, unless and until the first burst disk 60d is ruptured.

The outlet passage 162 includes a plurality of side passages 170 which extend outward from the cylindrical portion 166, at an angle of about 50° relative to the axis 24d. The side passages 170 establish fluid communication between the diffuser chamber 34d and the cylindrical portion 166 of the outlet passage 162. The side passages 170 provide a fluid flow path between the first burst disk 60d and the diffuser chamber 34d, when the second burst disk 62d is unruptured.

As with the inflator 10, the first burst disk 60d in the inflator 10d is designed to rupture at a lower pressure differential than the second burst disk 62d. Because both the first burst disk 60d and the second burst disk 62d are exposed to ambient pressure on one side, the two burst disks will rupture at different pressure levels of the inflation fluid 66d in the gas storage chamber 14d. The two burst disks 60d and 62d can be configured in any of the alternative manners illustrated in FIGS. 2A, 2B, 3A, 3B, 4A and 4B, to provide the different rupture pressures.

If only the first initiator assembly (not shown) of the inflator 10d is actuated, the pressure in the gas storage chamber 14d rises to a level sufficient to rupture the first burst disk 60d. Inflation fluid 66d flows through the opening 156 into the frustoconical portion 164 of the outlet passage 162 and thence into the cylindrical portion 166 of the outlet passage. The inflation fluid 66d contacts the second burst disk 62d, but the pressure of the inflation fluid is not great enough to rupture the second burst disk. The inflation fluid 66d instead flows out of the gas storage chamber 14d through the side passages 170 and into the diffuser chamber 34d.

If the second initiator assembly (not shown) of the inflator 10d is actuated in addition to the first initiator assembly, the pressure in the gas storage chamber 14d initially ruptures the first burst disk 60d. Inflation fluid 66d flows through the opening 156 into the frustoconical portion 164 of the outlet passage 162 and thence into the cylindrical portion 166 of the outlet passage. The inflation fluid 66d contacts the second burst disk 62d, and the pressure of the inflation fluid is great enough to rupture the second burst disk also, uncovering the opening 157. The inflation fluid 66d flows into the diffuser chamber 34d through both the side passages 170 and the cylindrical portion 166 of the outlet passage 162.

Figure 7:
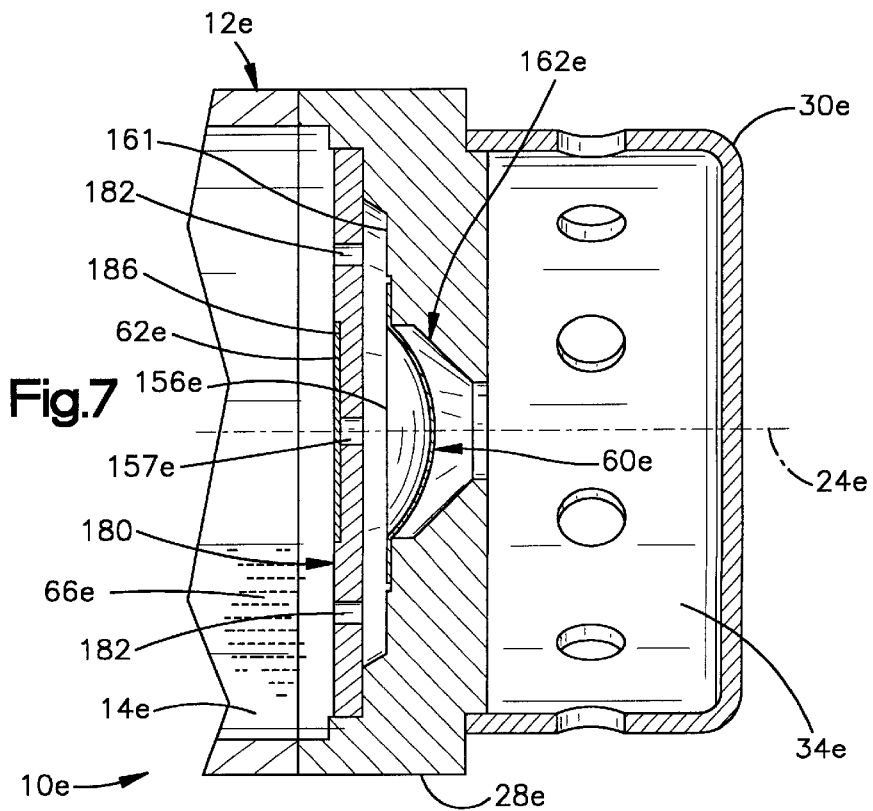
FIG. 7 is a view similar to FIG. 6 of a portion of an air bag inflator constructed in accordance with a third embodiment of the present invention.

FIG. 7 illustrates a portion of an inflator 10e constructed in accordance with a third embodiment of the present invention. The inflator 10e is generally similar in construction to the inflator 10d. Parts of the inflator 10e which are the same as, or similar to, parts of the inflator 10d are given the same reference numerals, with the suffix "e" added to distinguish them.

In the inflator 10e, the first burst disk 60e is welded to the inner end surface 161 of the second end wall 28e of the container 12e. The first burst disk 60e extends across an opening 156e in the inner end surface 161 of the second end wall 28e.

The container 12e includes a flat, circular manifold plate 180 secured to the second end wall 28e, inward of the first burst disk 60e. The manifold plate 180 has a circular array of openings 182 spaced radially outward from the axis 24e. The openings 182 communicate the fluid pressure in the gas storage chamber 14e to the first burst disk 60e. As a result, the first burst disk 60e is exposed on one side to the pressure of the inflation fluid 66e in the chamber 14e, and on its other side to the ambient air pressure in the diffuser chamber 34e.

The manifold plate 180 has a central opening 157e within a circular recess 186. The second burst disk 62e is flat and is fixed to the manifold plate 180 inside the recess 186. The second burst disk 62e could have a dome (not shown) projecting into the opening 157e. The second burst disk 62e extends across the central opening 157e in the manifold plate 180. The second burst disk 62e is thus located inside the gas storage chamber 14e and is exposed, on both sides, to the pressure of the inflation fluid 66e in the gas storage chamber. As in the inflator 10d, the second burst disk 62e in the inflator 10e is designed to rupture at a greater pressure differential than the first burst disk 60e.

If only the first initiator assembly (not shown) of the inflator 10e is actuated, the pressure in the gas storage chamber 14e, including the chamber portion located between the manifold plate 180 and the first burst disk 60e, rises only to a level sufficient to rupture the first burst disk. Inflation fluid 66e flows through only the outer openings 182 in the manifold plate 180 and contacts the first burst disk 60e. The first burst disk 60e ruptures, enabling inflation fluid to flow out of the gas storage chamber 14e through the opening 156e and into the diffuser chamber 34e. The pressure of the inflation fluid 66e is not great enough to rupture the second burst disk 62e. All the inflation fluid 66e flowing into the diffuser chamber 34e flows through only the openings 182 and the opening 156e; no inflation fluid flow through the opening 157e.

If the second initiator assembly (not shown) of the inflator 10e is actuated in addition to the first initiator assembly, the pressure in the gas storage chamber 14e initially ruptures the first burst disk 60e. Inflation fluid 66e flows through the opening 156e and the outlet passage 162e into the diffuser chamber 34e. The flow area of the outlet passages 182 is selected to restrict the fluid flow through the passages 182 so that the pressure of the inflation fluid 66e in the gas storage chamber 14e rises to a level sufficient to rupture the second burst disk 62e, in addition to the first burst disk 60e. As a result, the inflation fluid 66e flows into the diffuser chamber 34e through the central opening 157e in the manifold plate 180, as well as through the outer openings 182 in the manifold plate and the opening 156e in the container 12e.

Figure 8:
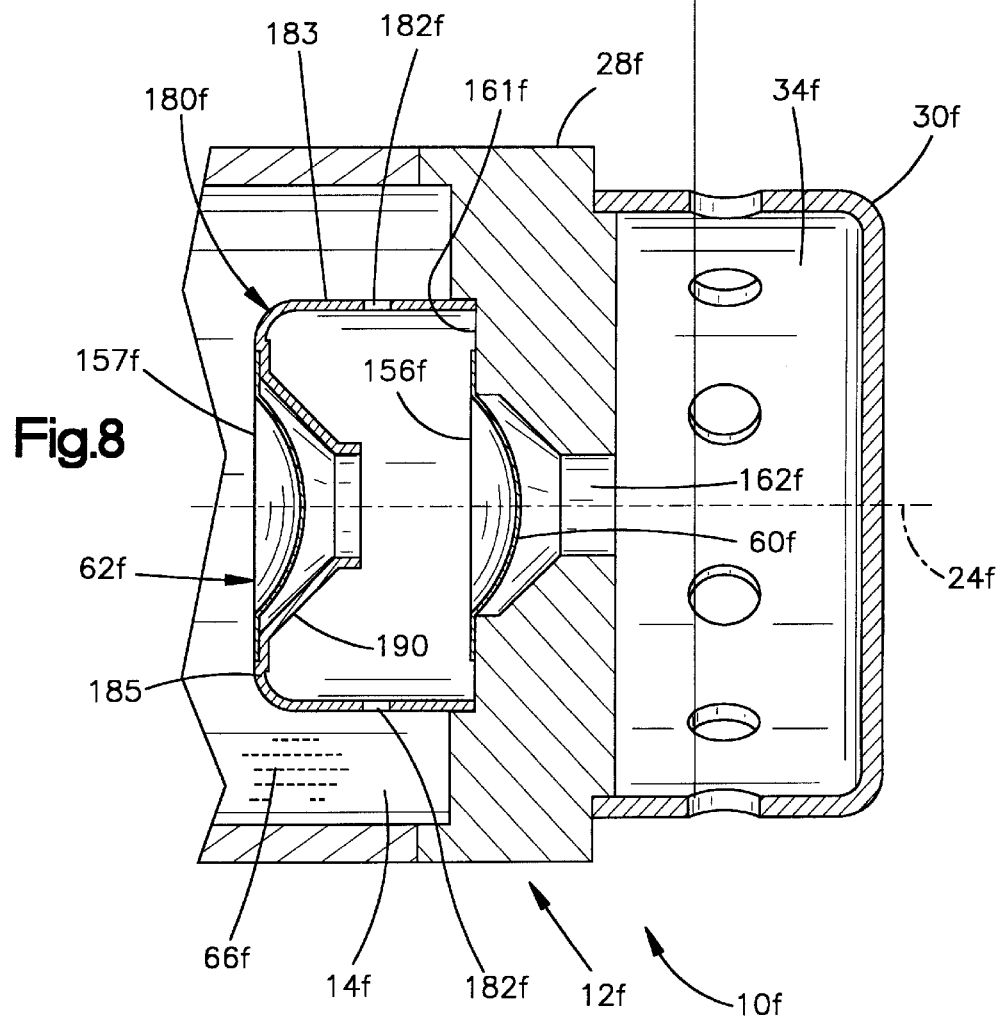
FIG. 8 is a view similar to FIG. 6 of a portion of an air bag inflator constructed in accordance with a fourth embodiment of the present invention.

FIG. 8 illustrates a portion of an inflator 10f constructed in accordance with a fourth embodiment of the present invention. The inflator 10f is generally similar in construction to the inflator 10e. Parts of the inflator 10f which are the same as, or similar to, parts of the inflator 10e are given the same reference numerals, with the suffix "f" added to distinguish them.

In the inflator 10f, the first burst disk 60f is welded to the inner end surface 161f of the second end wall 28f of the container 12f. The first burst disk 60f extends across an opening 156f in the inner side surface 161f.

A hollow, cylindrical manifold 180f is secured to the second end wall 28f, inside the gas storage chamber 14f and inward of the first burst disk 60f. The manifold 180f has a series of openings 182f in its cylindrical side wall 183. One side of the first burst disk 60f is exposed, through the openings 182f, to the pressure of the inflation fluid 66f in the chamber 14f. The first burst disk 60f is exposed on its other side to the ambient air pressure in the diffuser chamber 34f.

An end wall 185 of the manifold 180f has a frustoconical central portion 190. The second burst disk 62f is fixed to the end wall 185 of the manifold 180 and extends across a circular central opening 157f in the manifold. The second burst disk 62f is thus located inside the gas storage chamber 14f and is exposed, on both sides, to the pressure of the inflation fluid 66f in the chamber. As in the inflator 10e, the second burst disk 62f in the inflator 10f is designed to rupture at a greater pressure differential than the first burst disk 60f.

If only the first initiator assembly (not shown) of the inflator 10f is actuated, the pressure in the gas storage chamber 14f, including the chamber portion located between the manifold 180f and the first burst disk 60f, rises only to a level sufficient to rupture the first burst disk. Inflation fluid 66f flows through only the outer openings 182f in the side wall 183 of the manifold 180f and contacts the first burst disk 60f. The first burst disk 60f ruptures, enabling inflation fluid 66f to flow out of the gas storage chamber 14f through the opening 156f and into the diffuser chamber 34f. The pressure of the inflation fluid 66f is not great enough to rupture the second burst disk 62f. All the inflation fluid 66f flowing into the diffuser chamber 34f flows through only the openings 182f and the opening 156f.

If the second initiator assembly (not shown) of the inflator 10f is actuated in addition to the first initiator assembly, the pressure in the gas storage chamber 14f initially ruptures the first burst disk 60f. Inflation fluid 66f flows through the outlet passages 182f into the diffuser chamber 34f. The flow area of the outlet passages 182f is selected to restrict the fluid flow through the passages 182f so that the pressure of the inflation fluid 66f in the gas storage chamber 14f rises to a level sufficient to rupture the second burst disk 62f. As a result, the inflation fluid 66f flows into the diffuser chamber 34f through the central opening 157f in the end wall 185 of the manifold 180f, as well as through the openings 182f and the opening 156f.

From the above description of the invention, those skilled in the art will perceive improvements, changes and modifications in the invention. For example, instead of the inflator including only two burst disks, the inflator could include three or more burst disks which rupture at different pressure differentials across the respective burst disks. Also, the inflator could include a single burst disk structure having burst areas of different thickness, for example, and which areas burst at different pressure differentials across the respective area. Such improvements, changes and modifications within the skill of the art are intended to be covered by the appended claims.

Having described the invention, we claim:

1. An apparatus for inflating an inflatable vehicle occupant protection device, said apparatus comprising:

a container defining a gas storage chamber;

inflation fluid under pressure in said gas storage chamber;

a first opening in said container for enabling fluid flow from said gas storage chamber to the inflatable device;

a first burst disk extending across said first opening and being rupturable in response to an increase in the pressure differential across said first burst disk to a level above a first predetermined pressure differential;

first pressurizing means for, when actuated, increasing the pressure differential across said first burst disk to a level above the first predetermined pressure differential to rupture said first burst disk;

a second opening in said container for directing fluid flow from said gas storage chamber to the inflatable device;

a second burst disk extending across said second opening and being rupturable in response to an increase in the pressure differential across said second burst disk to a second predetermined pressure differential greater than the first differential; and second pressurizing means actuatable independently of said first pressurizing means for, when actuated, increasing the pressure differential across said second burst disk to a level above the second predetermined pressure differential to rupture said second burst disk, said apparatus having an actuated condition in which said first burst disk is ruptured and said second burst disk is unruptured so that all of said inflation fluid flows through only said first opening.

2. An apparatus as set forth in claim 1 having a first actuated condition in which said first burst disk is ruptured and said second burst disk is unruptured so that all of said inflation fluid flowing from said gas storage chamber flows along a fluid flow path which extends through only said first opening;

said apparatus having a second actuated condition in which the pressure in said gas storage chamber increases to a level at which both said first burst disk and said second burst disk are ruptured so that a first portion of said inflation fluid flows from said gas storage chamber along a fluid flow path which extends through only said first opening and a second portion of said inflation fluid flows from said gas storage chamber along a fluid flow path which extends through only said second opening.

3. An apparatus as set forth in claim 2 comprising a diffuser defining a diffuser chamber, each one of said first and second openings at least partially defining a separate fluid flow path extending between said gas storage chamber and said diffuser chamber.

4. An apparatus as set forth in claim 1 wherein said first burst disk is thinner than said second burst disk.

5. An apparatus as set forth in claim 1 wherein said first burst disk has one or more score lines and said second burst disk is free of score lines.

6. An apparatus as set forth in claim 1 wherein said first burst disk has score lines and said second burst disk has score lines which are shallower than said score lines of said first burst disk.

7. An apparatus as set forth in claim 1 wherein said container comprises a wall portion including said first and second openings, said first opening at least partially defining a first fluid flow path extending between said gas storage chamber and the inflatable device, said second opening at least partially defining a second fluid flow path spaced apart from said first opening and extending between said chamber and the inflatable device.

8. An apparatus as set forth in claim 1 having a first actuated condition in which said first burst disk is ruptured and said second burst disk is unruptured so that all of said inflation fluid flows from the gas storage chamber in a fluid flow path which extends through only said first opening; and said apparatus having a second actuated condition in which the pressure in said gas storage chamber increases to a level at which both said first burst disk and said second burst disk are ruptured so that a first portion of said inflation fluid flows from said gas storage chamber along a fluid flow path which extends through only said first opening and a second portion of said inflation fluid flows from said gas storage chamber along a fluid flow path which extends through both said first opening and said second opening.

9. An apparatus as set forth in claim 8 wherein said first burst disk when unruptured blocks contact of said inflation fluid in said gas storage chamber with said second burst disk.

10. An apparatus as set forth in claim 8 wherein said second burst disk is exposed to the fluid pressure in said gas storage chamber when said first burst disk is unruptured.

11. An apparatus as set forth in claim 8 wherein said first burst disk is thinner than said second burst disk.

12. An apparatus as set forth in claim 8 wherein said first burst disk has one or more score lines and said second burst disk is free of score lines.

13. An apparatus as set forth in claim 8 wherein said first burst disk has score lines and said second burst disk has score lines which are shallower than said score lines of said first burst disk.

14. An apparatus for inflating an inflatable vehicle occupant protection device, said apparatus comprising:

a container defining a gas storage chamber;

inflation fluid under pressure in said gas storage chamber;

a first opening in said container for enabling fluid flow from said gas storage chamber to the inflatable device;

a first burst disk area extending across said first opening and being rupturable in response to an increase in the pressure differential across said first burst disk area to a level above a first predetermined pressure differential;

first pressurizing means for, when actuated, increasing the pressure differential across said first burst disk area to a level above the first predetermined pressure differential to rupture said first burst disk area;

a second opening in said container for directing fluid flow from said gas storage chamber to the inflatable device;

a second burst disk area extending across said second opening and being rupturable in response to an increase in the pressure differential across said second burst disk area to a second predetermined pressure differential greater than the first differential; and second pressurizing means actuatable independently of said first pressurizing means for, when actuated, increasing the pressure differential across said second burst disk area to a level above the second predetermined pressure differential to rupture said second burst disk area, said apparatus having an actuated condition in which only said first burst disk area ruptures and said second burst disk area does not rupture.

15. An apparatus as set forth in claim 14 having a first actuated condition in which said first burst disk area is ruptured and said second burst disk area is unruptured so that all of said inflation fluid flowing from said gas storage chamber flows along a fluid flow path which extends through only said first opening;

said apparatus having a second actuated condition in which the pressure in said gas storage chamber increases to a level at which both said first burst disk area and said second burst disk area are ruptured so that a first portion of said inflation fluid flows from said gas storage chamber along a fluid flow path which extends through only said first opening and a second portion of said inflation fluid flows from said gas storage chamber along a fluid flow path which extends through only said second opening.

16. An apparatus for inflating an inflatable vehicle occupant protection device, said apparatus comprising:

a container defining a gas storage chamber;

inflation fluid under pressure in said gas storage chamber;

a first opening in said container for enabling fluid flow from said gas storage chamber to the inflatable device;

a first burst disk extending across said first opening and being rupturable in response to an increase in the pressure differential across said first burst disk to a level above a first predetermined pressure differential;

first pressurizing means for, when actuated, increasing the pressure differential across said first burst disk to a level above the first predetermined pressure differential to rupture said first burst disk;

a second opening in said container for directing fluid flow from said gas storage chamber to the inflatable device;

a second burst disk extending across said second opening and being rupturable in response to an increase in the pressure differential across said second burst disk to a second predetermined pressure differential greater than the first differential; and second pressurizing means actuatable independently of said first pressurizing means for, when actuated, increasing the pressure differential across said second burst disk to a level above the second predetermined pressure differential to rupture said second burst disk, said second pressurizing means including a larger amount of ignitable material than said first pressurizing means and said second pressurizing means producing a larger amount of combustion products than said first pressurizing means.

17. An apparatus as set forth in claim 16 wherein said first pressurizing means is incapable of increasing the pressure differential across said second burst disk to a level equal to or above the second predetermined differential.

18. An apparatus for inflating an inflatable vehicle occupant protection device, said apparatus comprising:

a container defining a gas storage chamber;

inflation fluid under pressure in said gas storage chamber;

a first opening in said container for enabling fluid flow from said gas storage chamber to the inflatable device;

a first burst disk extending across said first opening and being rupturable in response to an increase in the pressure differential across said first burst disk to a level above a first predetermined pressure differential;

first pressurizing means for, when actuated, increasing the pressure differential across said first burst disk to a level above the first predetermined pressure differential to rupture said first burst disk;

a second opening in said container for directing fluid flow from said gas storage chamber to the inflatable device;

a second burst disk extending across said second opening and being rupturable in response to an increase in the pressure differential across said second burst disk to a second predetermined pressure differential greater than the first differential; and second pressurizing means actuatable independently of said first pressurizing means for, when actuated, increasing the pressure differential across said second burst disk to a level above the second predetermined pressure differential to rupture said second burst disk, said first burst disk, when unruptured, blocking flow of said inflation fluid through both said first opening and said second opening.

19. An apparatus for inflating an inflatable vehicle occupant protection device, said apparatus comprising:

a container defining a gas storage chamber;

inflation fluid under pressure in said gas storage chamber;

a first opening in said container for enabling fluid flow from said gas storage chamber to the inflatable device;

a first burst disk extending across said first opening and being rupturable in response to an increase in the pressure differential across said first burst disk to a level above a first predetermined pressure differential;

first pressurizing means for, when actuated, increasing the pressure differential across said first burst disk to a level above the first predetermined pressure differential to rupture said first burst disk;

a second opening in said container for directing fluid flow from said gas storage chamber to the inflatable device;

a second burst disk extending across said second opening and being rupturable in response to an increase in the pressure differential across said second burst disk to a second predetermined pressure differential greater than the first differential; and second pressurizing means actuatable independently of said first pressurizing means for, when actuated, increasing the pressure differential across said second burst disk to a level above the second predetermined pressure differential to rupture said second burst disk, said second burst disk, when unruptured, including a first surface exposed to said inflation fluid and an opposite second surface exposed to said inflation fluid, said first surface and said second surface being in fluid communication when said second burst disk is in an unruptured condition.

20. An apparatus for inflating an inflatable vehicle occupant protection device, said apparatus comprising:

a container defining a gas storage chamber;

inflation fluid under pressure in said gas storage chamber;

a first opening in said container for enabling fluid flow from said gas storage chamber to the inflatable device;

a first burst disk extending across said first opening and being rupturable in response to an increase in the pressure differential across said first burst disk to a level above a first predetermined pressure differential;

first pressurizing means for, when actuated, increasing the pressure differential across said first burst disk to a level above the first predetermined pressure differential to rupture said first burst disk;

a second opening in said container for directing fluid flow from said gas storage chamber to the inflatable device, said second opening being in coaxial alignment with said first opening;

a second burst disk extending across said second opening and being rupturable in response to an increase in the pressure differential across said second burst disk to a second predetermined pressure differential greater than the first differential; and second pressurizing means actuatable independently of said first pressurizing means for, when actuated, increasing the pressure differential across said second burst disk to a level above the second predetermined pressure differential to rupture said second burst disk.

21. An apparatus for inflating an inflatable vehicle occupant protection device, said apparatus comprising:

a container having an end wall defining a gas storage chamber;

inflation fluid under pressure in said gas storage chamber;

a first opening in said end wall of said container for enabling fluid flow from said gas storage chamber to the inflatable device;

a first burst disk extending across said first opening and being rupturable in response to an increase in the pressure differential across said first burst disk to a level above a first predetermined pressure differential;

first pressurizing means for, when actuated, increasing the pressure differential across said first burst disk to a level above the first predetermined pressure differential to rupture said first burst disk;

a second opening in said end wall of said container for directing fluid flow from said gas storage chamber to the inflatable device, said first opening and said second opening forming parallel paths of flow for said inflation fluid out of said container;

a second burst disk extending across said second opening and being rupturable in response to an increase in the pressure differential across said second burst disk to a second predetermined pressure differential greater than the first differential; and second pressurizing means actuatable independently of said first pressurizing means for, when actuated, increasing the pressure differential across said second burst disk to a level above the second predetermined pressure differential to rupture said second burst disk.

* * * * *